Patented Apr. 30, 1929.

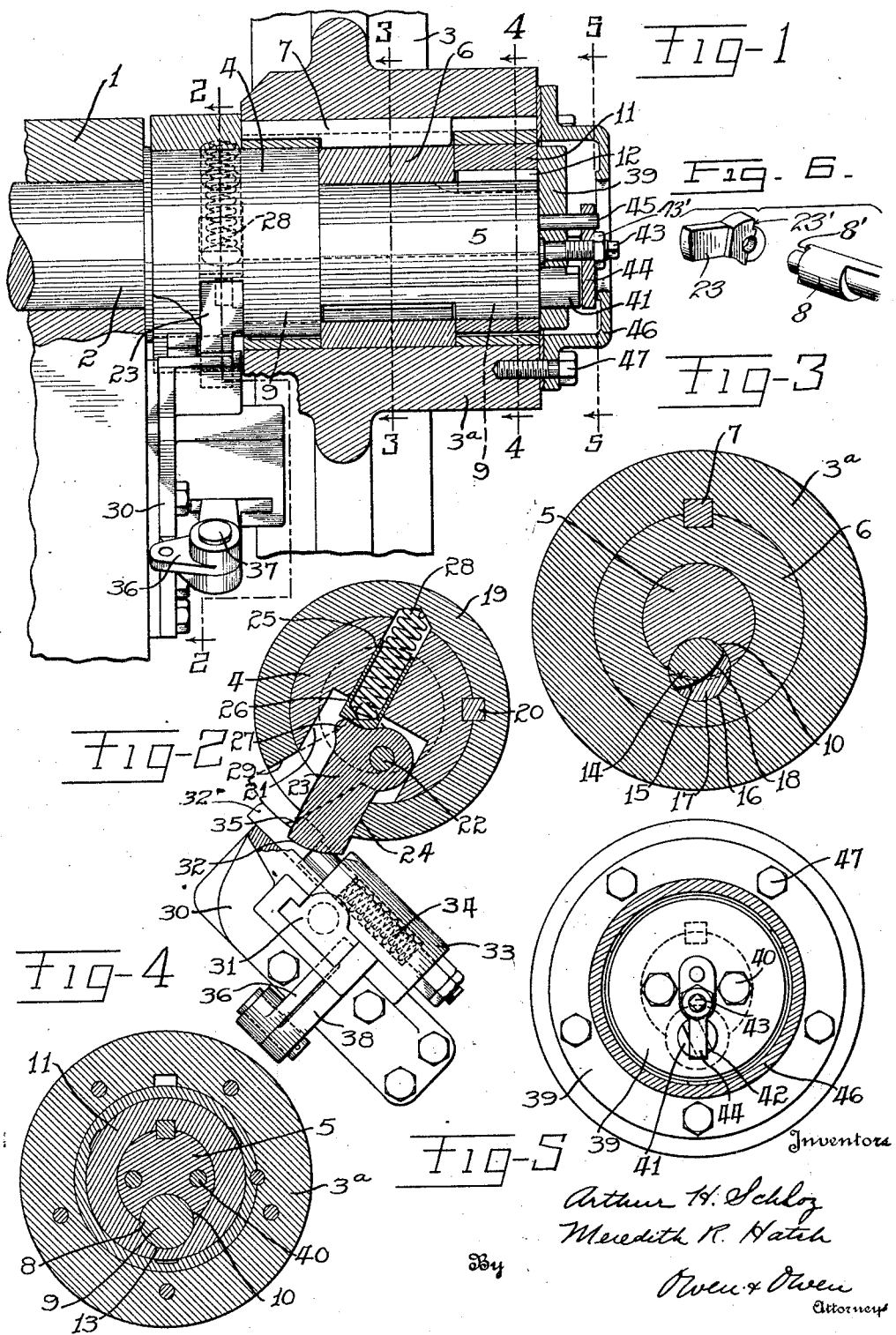

1,711,288

UNITED STATES PATENT OFFICE.

ARTHUR H. SCHLOZ AND MEREDITH R. HATCH, OF TOLEDO, OHIO, ASSIGNORS TO THE TOLEDO MACHINE & TOOL COMPANY, OF TOLEDO, OHIO, A CORPORATION OF OHIO.

CLUTCH.

Application filed February 23, 1928. Serial No. 256,263.

This invention relates to clutches, but more particularly to clutches for use in metal stamping presses, and for other uses where the driving and driven parts are intermittently, connected and disconnected, and where a relatively sturdy, reliable and efficient clutch is desirable.

Objects of this invention are to provide a simple and efficient clutch of the rolling or oscillatory key type having new and improved features of construction designed substantially to eliminate "backing" or rebounding, thereby to enhance the life of the parts and insure positive, efficient and satisfactory operation; to provide in connection with a clutch of the oscillatory key type, means for enabling convenient and reliable engagement between a driving and a driven part and avoiding wear, jarring and consequent noise between the parts when brought into operative engagement; to provide new and improved mechanism for causing the clutch to be moved to inoperative position in a simple and positive manner; to provide readily manipulatable means for holding the clutch out of operative position; and to provide a clutch of the above type having the new and improved features of construction, arrangement and operation hereinafter described.

One species of which this invention is a genus is shown by way of illustration in the accompanying drawings, in which:

Fig. 1 is a vertical sectional elevation of a portion of a press sufficient to show the clutch and associated parts;

Fig. 2 is a transverse section on the line 2—2 of Fig. 1 showing the mechanism for causing the clutch to be moved to inoperative position;

Fig. 3 is a transverse section on the line 3—3 of Fig. 1 showing the engaging portion of the clutch and filler piece in operative position;

Fig. 4 is a transverse section on the line 4—4 of Fig. 1; and

Fig. 5 is a transverse section on the line 5—5 of Fig. 1 showing the mechanism for holding the clutch key in inoperative position, and Fig. 6 is a detail view of the actuating arm and key.

The illustrated embodiment of the invention comprises a press having a frame 1 providing a bearing for the usual plunger-operating crank shaft 2. The end portion of the crank shaft 2 extends beyond the side of the frame 1, and concentric therewith is a driving wheel 3, which is adapted to transmit power to the shaft 2. The driving wheel 3 is provided with a hub $3^a$ which is co-extensive with the greater portion of the overhanging end of the shaft 2. The shaft 2 is provided adjacent the frame 1 with an enlarged portion 4, and the end of the shaft is provided with a reduced extension 5.

Surrounding the reduced extension 5 of the shaft is a collar 6, which abuts the shoulder formed by the enlarged portion 4, and is connected for rotation with the hub $3^a$ by a key 7. It is evident that the collar 6 rotates with the driving wheel 3, and may rotate about the reduced portion 5 of the driven shaft 2.

In order to provide a driving connection between the collar 6 and reduced extension 5, a rolling or oscillatory clutch key 8 is provided, and the key is formed with spaced bearing portions 9, one of the bearing portions being disposed in a semi-circular groove 10 of the reduced extension 5, and the other bearing portion being disposed in the enlarged portion 4 of the driven shaft. Surrounding the extreme end portion of the reduced extension 5, is a collar 11, which is fixed for rotation therewith by a key 12. The collar 11 is formed with a semi-circular recess or groove 13, as shown in Fig. 4, which is complemental to the recess 10 for accommodating the respective bearing portion 9.

Intermediate the spaced bearing portions 9 of the clutch key 8 is an engaging portion 14, which is disposed in the semi-circular recess 10 of the reduced extension 5, and is provided with an outer surface 15, which is concentric to the axis of the extension 5. When the clutch key is in such position that the outer surface 15 of the engaging portion 14 is disposed concentrically of the shaft extension 5, it is apparent that relative rotation between the driving collar and extension 5 is permitted. In order to clutch together the driving and driven parts, oscillation of the clutch key to position a portion thereof in the path of the collar 6 serves operatively to connect the driving and driven parts. The above construction will be apparent to those skilled in the art so far as the engaging portion of the clutch key is concerned, this construction being old in the art.

Considerable difficulty has heretofore been experienced with clutches of the oscillatory key type, in that oscillation of the key to operative position provides an excessive amount of lost motion causing the driving and driven parts when engaging to create a jar or shock, and resulting in "backing" or rebounding, which is not only annoying, but imparts a considerable strain on the associated parts.

To obviate this objection, the collar 6 is formed with a semi-circular groove or recess 16, which is complemental to the adjacent portion of the groove 10 in the shaft extension 5, and disposed within the groove 16 is a filler piece or pawl 17, the outer surface of which is curved to fit the groove 16, and the inner surface 18 is curved or shaped to fit the outer curved surface 15 of the engaging portion 14 of the key.

When the parts 14 and 17 are disposed in normal position, the inner surface 18 of the filler piece 17 is concentric to the axis of the shaft extension 5 so that the collar 6 is permitted to rotate independently of the shaft extension 5, a slight space being provided between surfaces 15 and 18. Upon oscillation of the key 8 to position the engaging portion 14 diagonally, as shown in Fig. 3, the filler piece 17 is concomitantly moved, thereby creating a driving connection between the parts, and substantially reducing rebounding or "backing" when the parts are brought into driving relation. It is obvious that oscillation of the key 8 to normal position correspondingly moves the filler piece 17 to release the parts from driving engagement.

By virtue of the above described arrangement, a positive driving connection is afforded between the parts, inasmuch as the filler piece 17 is engaged prior to the engagement of the portion 14 of the clutch key. It is well known that rebounding or "backing" is liable to occur in the press when the driving wheel is brought into engagement with the plunger-operating crank shaft, also when the plunger is brought into contact with the work in the event that the usual brake on the driven shaft permits the same to travel ahead of the driving wheel. Such rebounding is also liable to occur when the plunger has just passed over the bottom of its stroke due to the reaction of the press. By reason of the positive action of this clutch, the above mentioned objectionable features are unmistakably eliminated, and the lost motion between the parts is reduced to a minimum.

Surrounding the enlarged portion 4 of the shaft extension is a collar 19 secured thereto by a key 20, and formed in the collar 19 and enlarged portion 4 is a recess or cavity 21, into which projects a reduced extension 22 of the clutch key 8. Connected to the reduced extension 22 is a tail piece or arm 23, which is oscillatory with the clutch key, but is separable therefrom. At its inner end the key 8 is provided with a shoulder 8' which is adapted for engagement with shoulder 23' formed on arm 23 so as to connect the same with said key when the parts are moved toward each other in an axial direction. To remove the tail piece 23 without disassembling the entire clutch and removing drive wheel 3, it is merely necessary to depress the spring 28, detach plate 39 and slide key 8 forwardly axially of the driven shaft, whereupon the tail piece may be removed through the recess 21. The outer end of the tail piece extends beyond the periphery of the collar 19, and has limited swinging movement in the recess or cavity 21.

The tail piece 23 is normally held against a shoulder 24 on the collar 19, and in such position as to arrange the clutch key in operative driving position. For this purpose a recess 25 is formed in the enlarged portion 4 of the shaft extension and collar 19 at substantially right angles to the axis of the clutch key, and disposed therein is a plunger 26 bearing against a lug 27 on the tail piece 23, a coil spring 28, urging the plunger 26 into engagement with the shoulder 27 yieldingly to hold the tail piece against the shoulder 24. When the tail piece 23 is moved to the position indicated by the dotted lines in Fig. 2, the engaging portion 14 of the clutch key is moved to inoperative position to permit relative rotation of the driving and driven parts, a shoulder 29 on the collar 19 serving as a stop to limit the movement of the tail piece in a direction opposed to the shoulder 24.

In operation, the tail piece 23 rotates with the shaft extension and collar 19, and in order to disengage the clutch, an obstruction is movable into the path of the projecting portion of the tail piece 23 to cause the same to move against the shoulder 29 and hold the driven parts from further rotation. For this purpose a bracket 30 is secured to the frame 1, and mounted thereon is a slide 31, which is movable longitudinally of the axis of the shaft extension. Mounted on the slide 31 and movable therewith is a plunger 32 carried by a cylinder 33 and normally urged outwardly therefrom by a coil spring 34.

The head of the plunger 32 is provided with a reduced portion 32' which forms a shoulder 35, and when positioned in the path of the tail piece 23, the latter engages the head of the plunger 32 in the manner shown, and the force or shock of the impact is taken up by the coil spring 34. The tail piece may, but does not necessarily, abut against the shoulder 35. The tail piece 23 is accordingly caused to move against the shoulder 29 for disconnecting the driving and driven parts, as described. For imparting movement to the slide 31, a bell crank 36 is pivoted at 37 on a bracket arm 38, and may be connected in a suitable manner to a treadle or other means, for operation thereof.

It is frequently desirable to hold the clutch key out of clutching or engaging relation, and for this purpose a plate 39 is secured by bolts 40 to the shaft extension 5. Projecting through an opening in the plate or disc 39 is a reduced extension 41 of the clutch key 8, which is provided with a slot 42. Extending outwardly from the disc 39 is a screw bolt 43, which is rotatable in the disc 39, and in threaded engagement with the bolt 43 is a finger 44, adapted to project into the slot 42.

Turning movement of the finger 44 is prevented by a guide pin 45. It is apparent by turning the bolt 43 the finger 44 may be moved into or out of the slot 42. The slot 42 is so arranged that when engaged by the finger 44 the engaging portion of the clutch key is held out of clutching relation. Enclosing the above described parts is a housing 46, which is secured to the hub 3ª by bolts 47, an opening being provided therein to permit access to the adjusting bolt 43.

An important characteristic of the invention resides in enabling the removal of the clutch key 8 and tail piece 23 without removing the wheel 3 from the shaft extension. The housing or cap 46 is first removed and then the finger 44 is removed from bolt 43 after unscrewing nut 43'. Thereafter the disc 39 is removed to enable the clutch key to be pulled out of the complemental grooves 10 and 13. Removal of the clutch key also causes the filler piece 17 to be removed, as will be apparent.

It will be seen that we have provided a construction which satisfies the objects enumerated above, and one which constitutes a valuable advance in the art. While we have shown the invention in a certain physical embodiment, it is to be understood that modifications of the structure shown may be made by those skilled in this art without departing from our invention as expressed in the following claims.

What we claim as new and desire to secure by Letters Patent is:

1. A device of the character described comprising concentric driving and driven parts, a clutch key carried by one part and oscillatory on an axis longitudinally thereof, one end of said key being accessible at one end of said parts, a detachable arm on said clutch key for actuating the same, and spring means housed in the part carrying the key whereby disengagement of said arm, and depression of said spring means permits removal of the clutch key without disassembly of the driving and driven parts.

2. A device of the character described comprising a driving and a driven part, a rockable clutch key having spaced bearing portions in one part and an intermediate engaging portion, one end of said key projecting beyond the extremity of said part, means tending normally to hold said key in operative position, and means normally carried by said extremity for engagement with said key to hold the same in inoperative position.

3. A device of the character described comprising a driving and a driven part, a rolling clutch key carried by one part and movable into engagement with the other part, an arm on said clutch key extending at substantially right angles to the axis thereof, said clutch key having an engaging portion for engaging the other part, thereby to clutch the driving and driven parts together, the outer surface of said engaging portion being concentric with said parts, a separate element complemental to said engaging portion, and movable therewith to permit relative movement of said parts when the key is in unclutched position, but to provide a positive connection free substantially from rebounding when said key is moved to clutching position, one end portion of said clutch key being accessible at the extremity of the part carrying the same, means engageable with said accessible part for retaining the clutch key in inoperative position, and spring means housed within the part carrying the clutch key bearing against said arm for normally holding said clutch key in operative position.

4. A device of the character described comprising a driving and a driven part, a clutch key in one part for engaging the other part to effect a driving connection therebetween, a depending finger secured to one end of the clutch key, means associated with said clutch key and movable therewith for insuring a positive connection between the parts and substantially preventing backing or rebounding of the driving part when engaged by the driven part, an axially shiftable bracket mounted below the driven shaft and clutch key, a spring pressed plunger carried by said bracket and disposed transversely of the axis of said key, and means for shifting the bracket and thereby the plunger into and out of the path of said finger to move the key to its inoperative position.

5. A device of the character described comprising a driving and a driven part, a rotatable and axially removable clutch key interposed between said parts, a detachable finger carried by and rotatable with the clutch key, holding means for the key secured to the driven part and engaging the key to prevent axial displacement of the latter, and securing means for the holding means whereby detachment of the key and finger is permitted upon removal of the securing means and of the holding means.

6. A device of the character described comprising a driving and a driven part, an axially removable and rotatable clutch key interposed between said parts and a detachable actuating arm carried by said key, whereby removal of the actuating arm is permitted without disassembly of the driving and driven parts upon axial shifting of the clutch key in one direction.

In testimony whereof we have hereunto signed our names to this specification.

ARTHUR H. SCHLOZ.
MEREDITH R. HATCH.